United States Patent [19]

Wheatley

[11] 4,362,095

[45] Dec. 7, 1982

[54] STORAGE CONTAINER FOR GROUND COFFEE

[75] Inventor: Charles Wheatley, Tulsa, Okla.

[73] Assignee: Phyllis A. Wheatley, Tulsa, Okla. ; a part interest

[21] Appl. No.: 239,176

[22] Filed: Mar. 2, 1981

[51] Int. Cl.³ .................... B65D 81/20; A23B 0/00; B65D 51/16

[52] U.S. Cl. .................... 99/472; 206/524.8; 220/231

[58] Field of Search .............. 206/524.8, 315 B; 220/85 S, 87, 231, 234; 99/472

[56] References Cited

U.S. PATENT DOCUMENTS

| | | | |
|---|---|---|---|
| 1,373,244 | 3/1921 | Hernandez | 220/8 T |
| 1,635,815 | 7/1927 | Briggs | 99/472 |
| 2,036,007 | 3/1936 | Wheatley et al. | 99/472 |
| 2,157,624 | 5/1939 | Overmyer | 99/472 |
| 4,016,999 | 4/1977 | Denzer | 220/231 |
| 4,022,344 | 5/1977 | Roamer | 220/85 SP |

Primary Examiner—William T. Dixson, Jr.

Attorney, Agent, or Firm—Head, Johnson & Stevenson

[57] ABSTRACT

A vessel or container for storing ground coffee and which comprises a housing for receiving the ground coffee therein and having an access port and a discharge port in communication with the interior thereof, a handle member secured to the outer periphery of the housing and having a pump chamber provided therein, a passageway providing communication between the pump chamber and the interior of the housing, a check valve interposed in the passageway, a pump plunger reciprocally disposed in the pump chamber and a plunger rod extending axially outwardly from the plunger for facilitating the reciprocation of the plunger within the pump chamber, a removable cover provided for the access port and a removable plug member provided for the discharge port to seal the interior of the housing from the atmosphere whereby reciprocation of the plunger creates at least a partial vacuum in the interior of the housing for storing of the coffee ground in at least a partial vacuum for preserving the freshness thereof.

4 Claims, 5 Drawing Figures

STORAGE CONTAINER FOR GROUND COFFEE

BACKGROUND OF THE INVENTION

1. Field of the Invention

This invention relates to improvements in storage containers and more particularly, but not by way of limitation, to a vessel for storing ground coffee under at least a partial vacuum.

2. Description of the Prior Art

Ground coffee is usually vacuum packed in tins or canisters for maintaining the coffee fresh during an extended period of time prior to the use thereof. Of course, once a consumer opens the vacuum packed container, the vacuum is lost and the coffee grounds may quickly lose the freshness thereof. Many of the tins in use today for packaging of ground coffee are provided with a plastic cover member for sealing the tin or canister subsequent to the opening thereof in order to facilitating the retention of the freshness of the grounds, and many manufacturers of ground coffee recommend that the opened tin be stored under refrigeration subsequent to the opening thereof. These methods of maintaining the ground coffee fresh after opening of the original packed tin are usually unsuccessful, however, and the grounds quickly become stale whereby the coffee brewed therefrom loses much of its fresh flavor.

SUMMARY OF THE INVENTION

The present invention contemplates a novel vessel or container for storing coffee grounds in a manner for overcoming the foregoing disadvantages. The vessel or storage container comprises a housing for receiving the ground coffee therein and having an access port and a discharge port providing communication with the interior of the housing. A handle means is secured to the outer periphery of the housing for facilitating manipulation thereof, and a pump chamber is provided within the handle means for receiving a reciprocal plunger member therein. A plunger rod extends axially outwardly from the plunger and is readily accessible from the exterior of the housing whereby the plunger may be reciprocated within the pump chamber. A passageway extends from the pump chamber into communication with the interior of the housing, and check valve means is interposed in the passageway for precluding back flow of pressure during utilization of the pump plunger. A removable cover member is provided for the access port and a removable plug means is provided for the discharge port whereby the interior of the housing may be sealed from the atmosphere. In use, ground coffee may be admitted into the interior of the housing either through the access port or through the discharge port, as desired, and when the coffee has been disposed within the container or housing, the plug means may be inserted into the open outer end of the discharge port means and the cover member may be tightly engaged with the access port whereby the interior of the housing will be efficiently sealed from the atmosphere. The pump plunger may then be manually reciprocated within the pump chamber whereby at least a partial vacuum will be drawn in the interior of the housing. The check valve precludes back flow of pressure during the pumping operation, and filter means is provided on the inner end of the passageway for precluding the accidental movement of any of the coffee grounds into the passageway during a pumping operation. The coffee grounds may then be stored in the housing under at least a partial vacuum until such time as it is desired to remove some of grounds for purposes of brewing coffee. In order to discharge a quantity of the grounds from the interior of the housing, the cover may be "back off" slightly for relieving the vacuum and the plug means may then be readily withdrawn from engagement with the discharge port. The grounds may then be poured from the housing, and when a sufficient quantity has been discharged therefrom, the plug means and cover member may be returned to the sealing positions therefor. The novel container is simple and efficient in operation and economical in operation.

DETAILED DESCRIPTION OF THE PREFERRED EMBODIMENT

Figures 1, 3:
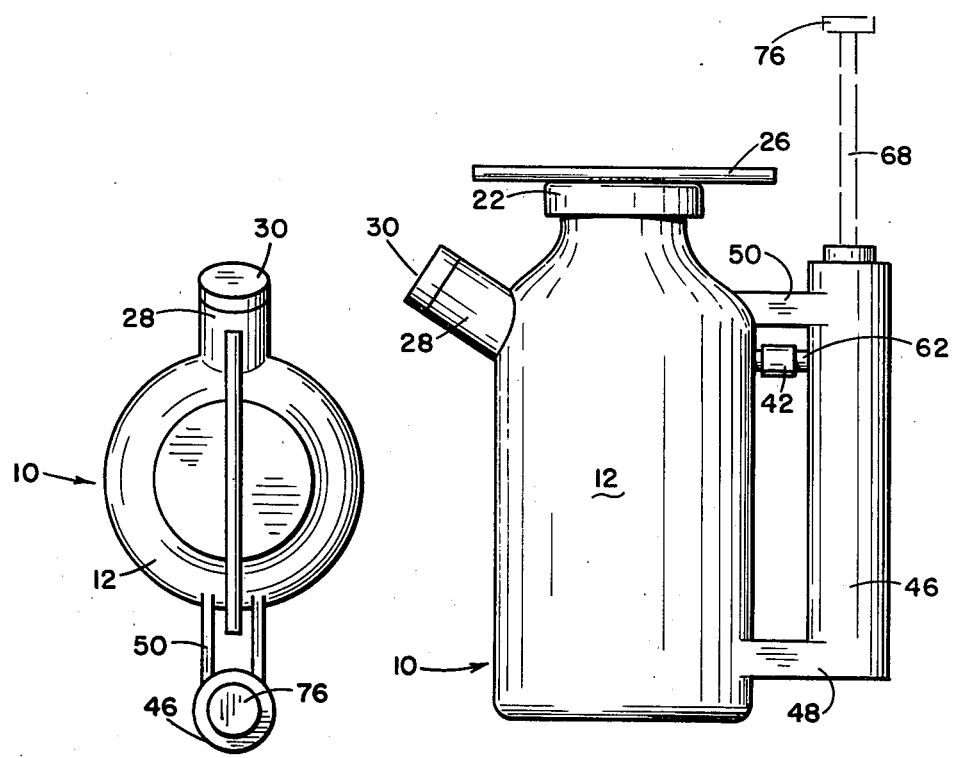
FIG. 1 is a side elevational side of a coffee grounds storage container embodying the invention, with a portion shown in broken lines for purposes of illustration.
FIG. 3 is a top view of a coffee grounds storage container embodying the invention.
Figure 2:
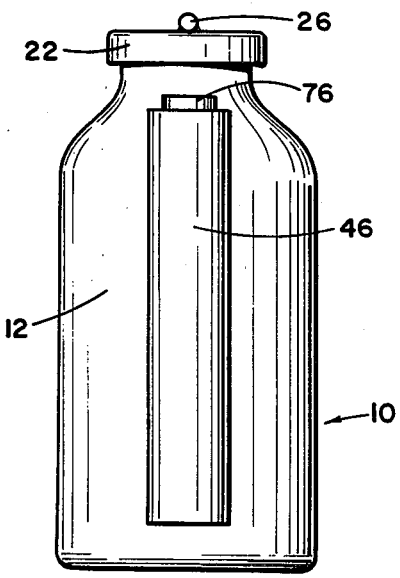
FIG. 2 is a view taken line 2—2 of FIG. 1.

Referring to the drawings in detail, reference character 10 generally indicates a coffee grounds storage container comprising a housing 12 having a coffee grounds receiving chamber 14 provided in the interior thereof. The housing is closed at one end by a bottom plate 16, and the opposite end is preferably provided with a reduced neck portion 18 which is open to provide an access port for the chamber 14. The outer periphery of the neck 18 is threaded, as shown at 20 for threadedly receiving a suitable cover or cap member 22 thereon. It is preferable to provide a suitable sealing gasket 24 between the outer end of the neck 18 and the cover 22 for providing an efficient seal therebetween. It is also preferable to provide a diametrically extending rod member 26 across the outer surface of the cover member 22 for facilitating removal and installation thereof on the neck 18, as will be hereinafter set forth in detail.

A discharge port 28, preferably in the form of a spout, but not limited thereto, is provided in the sidewall of the housing 12 interposed between the neck 18 and the bottom plate 16, and a suitable sealing plug member 30 is removably insertable in the open outer end of the port 28. The plug member 30 may be of any suitable type, and as shown herein comprises a resilient body 32 having an outer diameter for snugly fitting the inner diameter of the port 28, and an outwardly extending circumferential shoulder 34 for engagement with the outer end of the port 28 as particularly shown in FIG. 4. In addition, a tubing member 36 extends through a port 38 provided in the sidewall of the housing 12 and has one end 40 open to the chamber 14 and the opposite end in communication with a passageway 42 disposed exteriorly of the housing 12. A suitable filter means 44 is provided at the open end 40 of the tubing 36 for a purpose as will be hereinafter set forth. Whereas the filter means may be of any suitable type as shown herein the filter comprises a cage member constructed of a fine mesh material.

A handle means 46 is secured to the outer periphery of the housing 12 in any suitable manner, such as by a pair of spaced brace members 48 and 50, and is spaced therefrom for facilitating manipulation during use of the container 10. A centrally disposed passageway 52 is provided in the handle member 46 to provide a pump chamber. The passageway 52 is open at one end 54 and is closed at the opposite end by a wall 56 having a centrally disposed bore 58 extending from the chamber 52 to the exterior of the handle 46. A port 60 is provided in the sidewall of the chamber 52 and spaced slightly below the wall 56 as particularly shown in FIG. 4. A sleeve member 62 is disposed in the port 60 and provides communication between the chamber 52 and the passageway 42. A suitable check valve means 64 is disposed in the passageway 42 and interposed between the tubing 36 and sleeve 62 for providing flow of fluid through the passageway 42 in one direction only.

A plunger member 66 is reciprocally disposed within the chamber 52 and is preferably constructed of a suitable yieldable material whereby an efficient sealing is provided between the outer periphery thereof and the inner periphery of the chamber 52. A rod member 68 extends through the plunger 66 and may be secured therein in any suitable manner, such as by a lock washer 70 and nut 72, as is well known. The rod 68 extends through the passageway or bore 58 and beyond the outer extremity of the handle 46, and it is preferably to provide a suitable sealing means 74 between the rod 68 and bore 58 for precluding leakage of fluid therebetween. A head member 76 is provided at the outer end of the rod 68 for limiting the movement thereof in one direction and for facilitating manual reciprocation thereof during operation of the plunger 66 as will be hereinafter set forth.

When ground coffee, or the like, is to be stored in the container 10, the coffee may be either admitted into the chamber 14 through the neck 18 or spout 28, as desired. In the event it is desirable to pour the grounds through the neck 18, the cover 22 may be removed from the neck 18 to provide access to the chamber 14. In the event it is desirable to pour the grounds through the spout 28, the plug 30 may be removed therefrom to provide access to the chamber 14. In this case, it may be desirable to utilize the funnel member, or the like, (not shown) for facilitating directing of the coffee grounds through the spout and into the chamber 14. When the spout is to be used for admitting the grounds into the chamber 14, it may also be necessary to "back off" the cover 22 slightly to relieve any vacuum which may be present in the container 14, thus permit easy removal of the plug means 30 from the spout 28.

Figure 4:
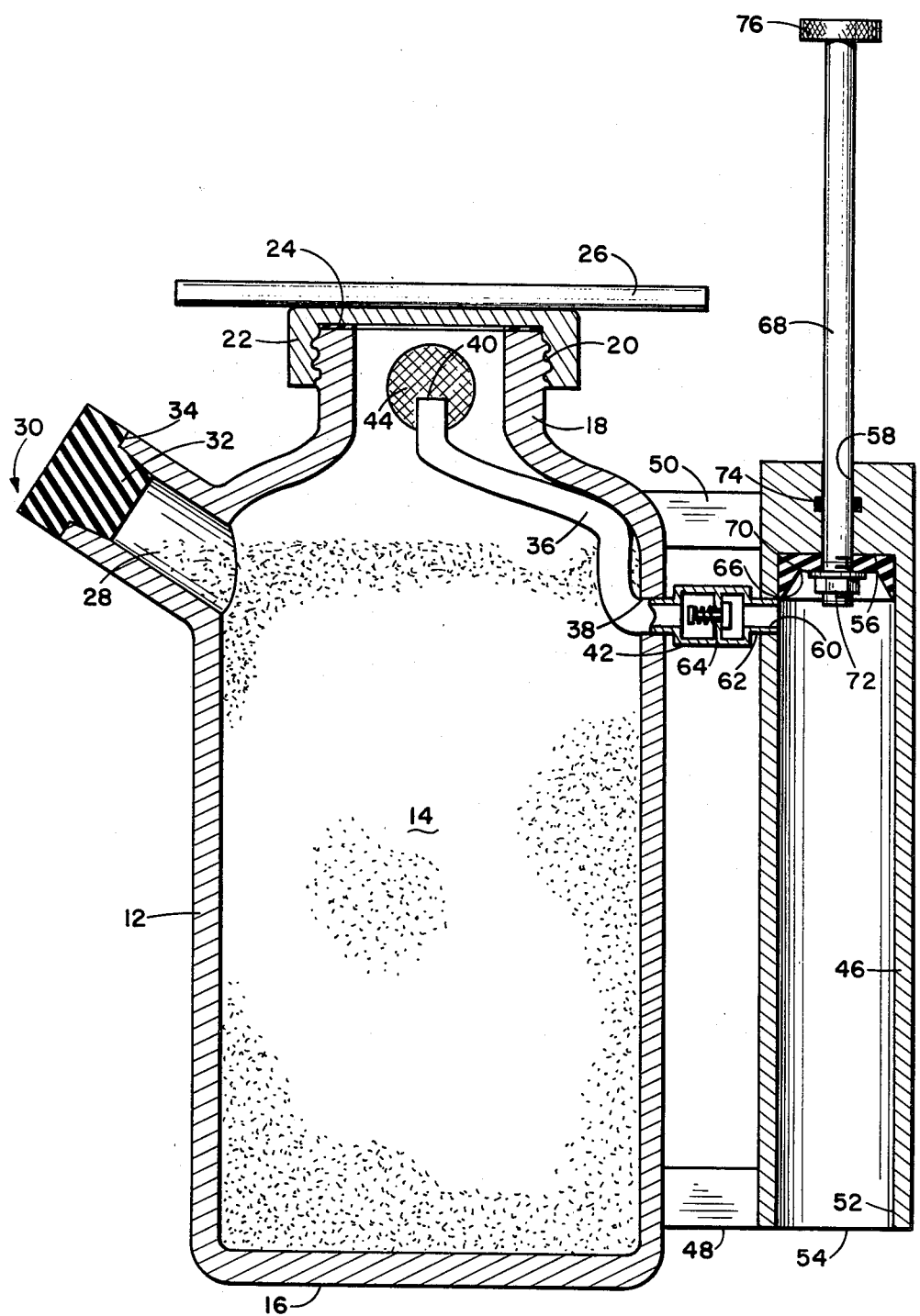
FIG. 4 is an enlarged sectional elevational view of a coffee ground storage container embodying the invention, and illustration one position for the pump plunger utilized in the invention.
Figure 5:
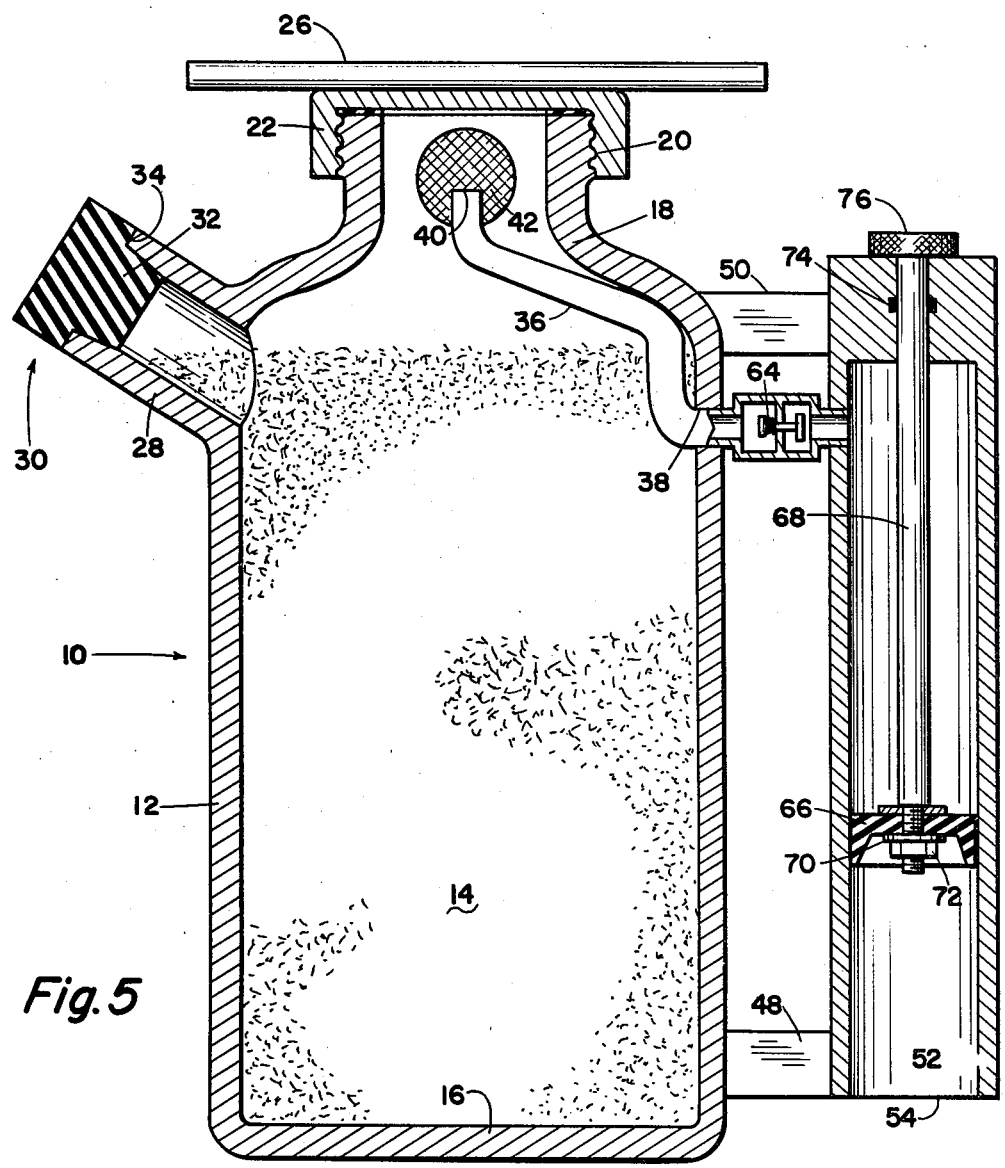
FIG. 5 is a view similar to FIG. 4, illustrating another position for the pump plunger utilized in the invention.

When the coffee has been placed in the chamber 14, the plug means 30 may be replaced in the sealing position within the spout 28, and the cover member 22 may be tightly engaged with the neck 18 to provide a seal therebetween. The rod 68 may then be reciprocated for reciprocation of the plunger 66 within the pump chamber 52. On the downstroke, as viewed in FIG. 5, the plunger 56 will draw air from the chamber 14 through the tubing 36 and passageway 42. The pressure will open the check valve 42 and permit the air to be withdrawn into the chamber 52 behind the plunger 66. On the upstroke of the plunger as shown in FIG. 4 the air cannot be forced back into the tubing 36 since the check valve will be closed. In this manner at least a partial vacuum will be created within the housing 14. Of course, the filter means 14 precludes passage of the ground coffee into the open end 40 of the tubing 36.

As hereinbefore set forth, the plunger 66 is preferably constructed from a suitable yieldable material to provide a sealing engagement with the inner periphery of the chamber 52, thus providing an efficient pumping action. However, the plunger is sufficiently yieldable to permit the escape of the air therearound on the upstroke whereby a continued reciprocation of the plunger may be accomplished to achieve a relatively great vacuum in the chamber 14. In this manner, the ground contained in the chamber 14 may be stored at a vacuum condition for greatly increasing the freshness thereof during prolonged periods of storage.

When it is desired to retrieve a portion of the stored coffee ground for brewing coffee, the cover member 22 may be "backed off" slightly for relieving the vacuum within the chamber 14, and the plug means 30 may be easily removed from the spout 28 whereby the required quantity of coffee grounds may be poured from the chamber 14. When the desired supply of coffee grounds has been achieved, the plug means 30 may be returned to the sealing position thereof, and the cover 22 may be tightened against the outer end of the neck 18, and the pumping operation may be repeated for restoring the vacuum condition within the chamber 14.

From the foregoing it will be apparent that the present invention provides a novel container for storing coffee grounds under vacuum conditions for extended periods while permitting ready retrieval of desired quantities of the ground coffee for brewing purposes, or the like. The freshness of the ground coffee may thus be maintained for prolonged time periods, thus increasing the quality and flavor of the coffee brewed therefrom.

What is claimed is:

1. A storage container comprising a housing having one closed end and one open end, removable sealing cover means provided for said open end, discharge port means provided in the sidewall of the housing and interposed between the open end and closed end thereof, sealing plug means removably disposed in said discharge port means, handle means secured to the outer periphery of the housing means, pump chamber means provided in the handle means, passageway means having one end open to the upper portion of the pump chamber and the opposite end open to the interior of the housing between the cover means and discharge port means providing communication between the pump chamber means and interior of the housing, check valve means interposed in the passageway means for precluding backflow of fluid therethrough, and reciprocal plunger means disposed in said pump chamber means for selectively creating a vacuum in the interior of the housing.

2. A storage container as set forth in claim 1 wherein filter means is provided at the end of the tubing means open to the interior of the housing.

3. A storage container as set forth in claim 1 wherein the pump chamber means comprises a pump passageway provided in the handle means and having one end thereof open and the opposite end thereof closed, a bore extending through the closed end of the pump passageway, and said plunger means is reciprocally disposed in said pump passageway.

4. A storage container as set forth in claim 1 wherein the plunger means comprises a plunger member reciprocally disposed in said pump passageway, a rod member secured to the plunger member and extending through the bore of the closed end of the pump passageway, a head member provided on the outer end of the rod member and disposed exteriorly of the handle means for facilitating reciprocation of the plunger means in the pump passageway and limiting movement of the rod member in one direction.

* * * * *